United States Patent [19]

Kano et al.

[11] 3,742,653
[45] July 3, 1973

[54] CONTROL DEVICES FOR THE RADIAL DISPLACEMENT OF SHAFTS

[75] Inventors: Kimio Kano, Aichi-ken; Keiichi Nakamura; Shojiro Niitaka, both of Kariya, all of Japan

[73] Assignee: Toyoda Koki Kabushiki Kaisha, Aichi Pref., Japan

[22] Filed: July 13, 1971

[21] Appl. No.: 162,238

[30] Foreign Application Priority Data

Aug. 5, 1970 Japan.............................. 45/68834

[52] U.S. Cl. ............................ 51/165.9, 308/122
[51] Int. Cl. ....................... E05d 15/22, F16c 17/16
[58] Field of Search........................... 308/122, 9 A; 51/165 R

[56] References Cited
UNITED STATES PATENTS
2,459,826   1/1949   Martellotti.......................... 308/122

Primary Examiner—Charles J. Myhre
Assistant Examiner—Frank Susko
Attorney—E. F. Wenderoth, V. M. Creedon et al.

[57] ABSTRACT

In a control device for the radial displacement of a shaft supported in a fluid bearing, the bearing including a plurality of circumferentially spaced apart pressure pockets surrounding the shaft and a control valve for creating a pressure differential in the pressure of the pressurized fluid admitted into selected ones of the pressure pockets for radially displacing the shaft, there are provided electromotive means for operating the control valve, and a digital control for the electromotive means for regulating the speed and quantity of the radial displacement of the axis of the shaft.

8 Claims, 3 Drawing Figures

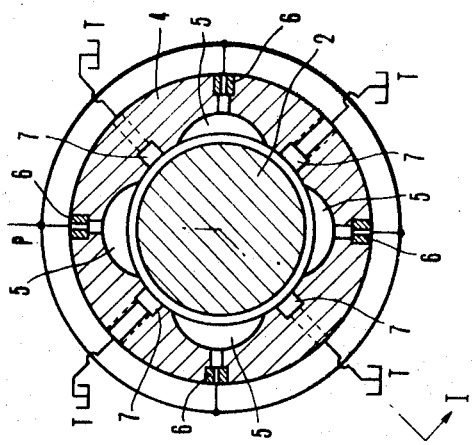
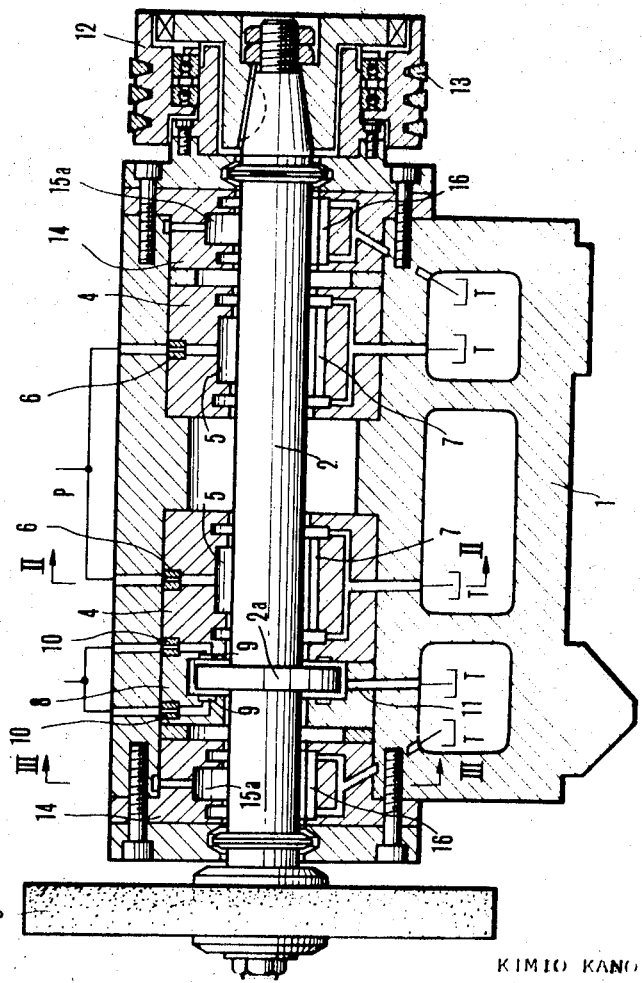

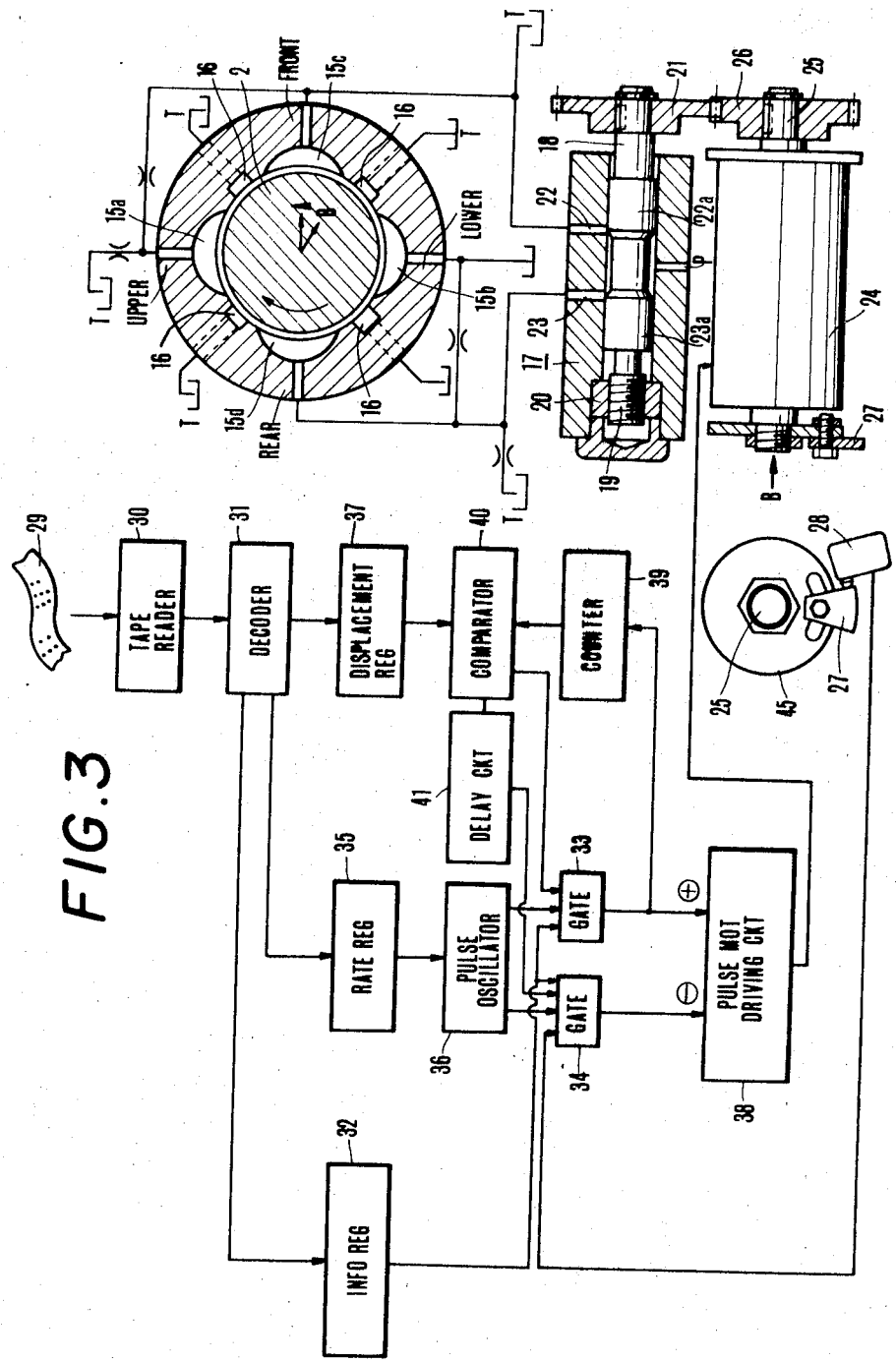

3,742,653

CONTROL DEVICES FOR THE RADIAL DISPLACEMENT OF SHAFTS

BACKGROUND OF THE INVENTION

This invention relates to a control device for the radial displacement of a shaft supported in a fluid bearing, and more particularly to a control device for feeding a grinding wheel towards a workpiece under a digital control.

The feed of a grinding wheel toward a workpiece is generally preformed by advancing the grinding wheel carriage. Such a feed of the grinding wheel carriage is not required to be extremely accuracy during the coarse and fine grinding operations but should be very accurate during final stage of the grinding operation in which sparkout operation is performed subsequent to the fine grinding operation. However, it is difficult to accurately feed a massive grinding wheel carriage due to a stick-slip or back-lash of the ball nut screw assembly of a feed screw.

U.S. Pat. No. 2,663,977 to P. Gerard et al., dated Dec. 29, 1953 discloses a system for controlling the position of a shaft in its bearing wherein a plurality of circumferentially spaced apart pressure zones or pockets are provided for a stationary bearing surface and fluid under pressure is selectively admitted into the pressure zones under control of a control valve to radially displace the axis of the shaft. P. Gerard et al. taught that the shaft bearing may be employed with machine tools of various type.

This type of bearing can be advantageously used to feed the grinding wheel in a small amount during the accurate finishing step. However, with the control valve disclosed by P. Gerard et al. it is impossible to feed the grinding wheel at a speed and quantity of displacement instructed by a digital control.

SUMMARY OF THE INVENTION

It is therefore an object of this invention to provide a novel control device for the radial displacement of a shaft supported in a fluid bearing utilizing a digital control.

More specific object of this invention is to provide an improved control device for an accurate and fine feed of a grinding wheel with a digital control without the necessity of feeding the massive grinding wheel carriage.

In accordance with the invention, in a control device for the radial displacement of a shaft supported in a fluid bearing the bearing including a plurality of circumferentially spaced apart pressure pockets surrounding the shaft and a control valve for creating a pressure differential in the pressure of the pressurized fluid admitted into selected ones of the pressure pockets for radially displacing the axis of the shaft, there are provided electromotive means for operating the control valve, and a digital control for the electromotive means for regulating the speed and quantity of the radial displacement of the axis of the shaft.

When embodied in the feed control of a grinding wheel the invention enables extremely accurate fine feeding of the shaft carrying the grinding wheel under the control of a digital control.

BRIEF DESCRIPTION OF THE DRAWINGS

In the accompanying drawings:

FIG. 1 shows a longitudinal sectional view, taken along the line I—I of FIG. 2, of a bearing assembly embodying the invention as applied to a grinding wheel carriage;

FIG. 2 shows a cross-sectional view of the bearing assembly shown in FIG. 1 taken along line II—II and FIG. 3 is a block diagram of a control system for feeding the grinding wheel including a cross-sectional view of the bearing assembly taken along a line III—III in FIG. 1.

DESCRIPTION OF THE PREFERRED EMBODIMENT

As shown in FIG. 1, a grinding wheel 3 is secured to one end of a shaft 2 journalled by a fluid bearing assembly on a grinding wheel carriage 1. The shaft 2 is driven by an electric motor, not shown, through a pulley 12 secured to the other end of the shaft and a belt 13. The bearing assembly comprises a pair of axially spaced apart fluid pressure radial bearing metals 4 each provided with a plurality of circumferentially spaced apart pressure pockets 5 to which fluid under pressure is admitted through throttle valves 6. The fluid admitted in each pocket flows circumferentially through the gap between the bearing metal and the shaft into a reservoir T via discharge ports 7 as shown in FIG. 2. Thus, shaft 2 is rotatably supported by a hydrostatic pressure generated in respective pockets 5. The bearing assembly also includes a fluid thrust bearing metal 8 in which fluid pressure pockets 9 are defined on the opposite sides of a flange or shoulder 2a on shaft 2. The fluid under pressure is supplied to pockets 9 via throttle valves 10 and is discharged into reservoir T via the gap between the flange 2a and bearing metal 8 and through a discharge port 11. In this manner, the thrust acting upon shaft 2 is supported by the hydrostatic force generated in pressure pockets 9.

Members 14 for displacing the axis of shaft 2 from its normal concentric position are provided near its opposite ends. More particularly, as shown in FIG. 3 each member 14 is formed with four pockets 15a, 15b, 15c, and 15d, 90° space apart in the circumferential direction. Thus, to shift the axis of shaft 2 in the forward direction (to the right as viewed in FIG. 3) or to feed the grinding wheel toward a workpiece, not shown, the pressure of the fluid supplied to the rear pocket 15d is increased beyound the pressure of the fluid supplied to the front pocket 15c thus creating a pressure differential between front and rear pockets 15c and 15d. This causes a displacement of the axis in the direction of arrow A, but due to the rotation of the fluid which follows the rotation of the shaft, the axis is shifted in the direction of arrow B with the result that the axis is not shifted correctly in the forward direction. To compensate for this, the fluid under pressure is also admitted into the lower pocket 15b. Displacement of the axis in the opposite direction is performed in the same manner but with higher pressure in pocket 15c than in pocket 15d. The fluid under pressure admitted into respective pockets 15a, 15b, 15c and 15d is discharged into reservoir T through the gaps between members 14 and shaft 2 and through discharge conduits 16.

A control valve 17 is included in the supply line for the pressurized fluid for presetting the feed speed and feed quantity.

FIG. 3 shows a construction of control valve 17 and an electric circuit for automatically adjusting the same under the control of a digital control. As shown the sleeve of control valve 17 is provided with two axially spaced apart ports 22 and 23 for supplying the pressurized fluid to the upper and front pockets 15a and 15c and to the rear and lower pockets 15d and 15b, respectively, and a spool 18 axially slidable in the sleeve of valve 17 to regulate the fluid passing through ports 22 and 23. Spool 18 is provided with a pair of axially spaced apart lands 22a and 23a cooperating with ports 22 and 23 respectively. Fluid under pressure is supplied to the control valve through an inlet port P intermediate ports 22 and 23. One end of spool 18 is formed with screw threads 19 that mate with a stationary nut 20 secured to the left hand side of the sleeve of valve 17. The opposite end of spool 18 extends outwardly beyound the sleeve of valve 17 and a gear 21 is keyed to this extension. An electromotive means in the form of a pulse motor 24 is provided to drive gear 21 through a gear 26 having teeth of relatively large toothe width. On the opposite end of the shaft of the pulse motor 24 is secured disc 45 on which a dog 27 is adjustably secured to define a normal position of shaft 2 through the position of shaft 25 or spool 18. In the preferred embodiment the normal position is defined so that shaft 2 may be in concentric relationship with bearing metal 4. The dog 27 operates a limit switch 28 when shaft 2 is in its normal position. The pulse motor 24 is driven over predetermined angles by the instruction pulse signals generated by a tape in the following manner.

The block diagram shown in FIG. 3 illustrates one example of the digital control circuit for pulse motor 24. Various data stored on an input tape 29 is read out by a tape reader 30. The outputs thereof are supplied to an information registor 32 which presets the axis displacement signal, a rate registor 35 and a displacement register 37 via a decoder 31. Information register 32 provides an instruction signal for opening and closing gate circuits 33 and 34. Rate register 35 is preset with a frequency of the pulse generated by a pulse oscillator 36, or the radial feed speed of the axis of shaft 2. The displacement register 37 is preset with the number of pulses supplied to the pulse motor 24 from pulse oscillator 36 via gate circuits 33 and 34 and a pulse motor driving circuit 38. A counter 39 is used to count the number of pulses supplied to pulse motor 24 and the number of count thereof is compared with the preset valve in displacement register 37 by a comparator 40. Between comparator 40 and gate circuit 34 is connected a delay circuit 41. A further detailed description of the digital control circuit and the components thereof will not be given since such digital control circuit and components are well known to those skilled in the art but reference is made to "U.S. Pat. No. 2,922,940", Jan. 26, 1960, by H.W. Mergler.

In operation, the axis displacement is performed prior to the sparkout operation or subsequent to the fine grinding operation. Accordingly, when the fast feed, coarse grinding feed and fine grinding feed operations of the grinding wheel carriage 1 which are instructed by tape 29 are completed during a grinding cycle, the tape 29 is advanced by one block and the radial displacement instruction of axis stored therein is read by tape reader 30. The read out of radial displacement instruction is discriminated by decoder 31, of which the quantity of displacement or feed is preset in displacement register 37 whereas the radial displacement speed or feed speed is preset in rate register 35 whereby the oscillation frequency of pulse oscillator 36 is set in accordance with the radial displacement instruction. Concruently therewith, a radial displacement signal is preset in information register 32 to open or enable gate circuit 33. When opened, gate circuit 34 applies the pulse generated by pulse oscillator 36 to pulse motor 24 through pulse motor driving circuit 38. Whereupon, shaft 25 of pulse motor 24 rotates an angle corresponding to the number of pulses applied thereto, and the rotation is transmitted to spool 18 through gears 26 and 21. Due to the threaded engagement between spool 18 and stationary nut 20, the rotation of spool 18 causes it to move axially in one direction, for example, to the left as viewed in FIG. 3 tending to close porte 22 and open port 23. This increases the pressure of the fluid admitted into the rear and lower pressure pockets 15d and 15b in the members 14, thus creating a pressure differential between the pressure in these pockets 15d and 15b and that in the upper and front pressure pockets 15a and 15c. Consequently, the axis of shaft 2 is radially displaced in the forward direction A to feed the grinding wheel toward the workpiece, not shown. The speed and quantity of feed are determined by the speed and quantity of the axial displacement of spool 18 caused by the operation of pulse motor 24. When the axis has been displaced to a desired position, or when the number of pulses applied to pulse motor 24 from pulse oscillator 36 and counted by counter 39, and the number of pulses that has been preset in displacement register 37 coincide each other, comparator 40 will provide a coincidence signal to gate circuits 33 and 34. This coincidence signal immediately closes or disenables gate circuit 33, but opening of gate circuit 34 is delayed by the action of delay circuit 41. Thus, the pulse generated by pulse oscillator 36 will not be supplied to pulse motor driving circuit 38 until gate circuit 34 is opened. During this internal, the axis of shaft 2 is maintained at the extreme end of its radial movement to perform sparkout operation. When gate circuit 34 is opened by the delayed pulse, after the sparkout operation, the pulse generated by pulse oscillator 36 is applied to pulse motor 24 through pulse motor driving circuit 38. Thus, the shaft 25 of pulse motor 24 is rotated in the opposite direction and its rotation is transmitted to spool 18 through gears 26 and 21. Then, the spool is moved to the right as viewed in FIG. 3 to bring the openings of ports 22 and 23 to the normal or neutral condition, thus equalizing the pressures in the front and rear pockets 15c and 15d to move backwardly the axis of shaft 2. Whereupon, dog 27 secured to shaft 25 of pulse motor 24 actuates limit switch 28 to confirm that the pulse motor has been brought back to the original or normal position. closure of switch 28 disenables gate circuit 34 to prevent the pulse generated by pulse oscillator 36 from passing through gate circuit 34. As a result, the reverse rotation of pulse motor 24 is stopped thus bringing the axis of shaft 2 to the normal or neutral position.

Thus, this invention provides a feed control device in which a control valve for controlling the speed and quantity of feed or radial displacement of the axis of the shaft carrying a grinding wheel is automatically regulated by the operation of a pulse motor operated by the instruction from a tape so that it is possible to digitally control the feed when performing the digital control of a grinding machine thus enabling full automation of the grinding cycle. Thus, it is not only possible to provide a stepwise feed of the grinding wheel, but also to provide an accurate feed quantity corresponding to the number of pulses applied to the pulse motor. Moreover the control device is simple in construction and is easy to install.

It should be understood that the method of controlling the feed of the grinding wheel is not limited to the illustrated example but may be varied variously by modifying the control circuit. For example, it is possible to provide a feedback control by constructing the feed back circuit such that only the frequency of the pulse generated by the pulse oscillator is instructed by the tape and that the feed quantity or the number of pulses supplied to the pulse motor from the oscillator is controlled by a gate circuit operated by sizing signals transmitted from a well known Schmidt circuit received an output which is generated by a sizing device in accordance with a size of workpiece.

In accordance with the provisions of the patent statutes, we have explained the principle and operation of our invention and have illustrated and described what we consider to represent the best embodiment thereof. However, we desire to have it understood that within the scope of the appended claims, the invention may be practiced otherwise than as specifically illustrated and described.

What is claimed is:

1. A control device for the radial displacement of a shaft supported in a fluid bearing, comprising displacing means including a plurality of circumferentially spaced apart pressure pockets surrounding said shaft, a control valve to create a pressure differential in the pressure of the pressurized fluid admitted into selected ones of said pressure pockets for radially displacing the axis of said shaft, electromotive means for operating said control valve, and digital control means to control said electromotive means for regulating the speed and quantity of the radial displacement of said axis of said shaft.

2. A control valve according to claim 1, in which said displacing means is mounted in coaxial relationship with said fluid bearing.

3. The control device according to claim 1 wherein said electromotive means comprises a pulse motor coupled to said control valve.

4. The control device according to claim 1 wherein four of said pressure pockets are provided on the upper and lower sides and on the front and rear sides of said shaft, and wherein said control valve is provided with two outlet ports for said pressurized fluid, one of said ports leading to said upper and front pressure pockets whereas the other to said lower and rear pressure pockets, thus displacing said axis in the forward or rearward direction.

5. The control device according to claim 1 wherein said shaft carries a grinding wheel so that said grinding wheel is moved toward and away from a workpiece.

6. The control device according to claim 1 wherein said control valve comprises a sleeve provided with two axially spaced apart fluid outlet ports and, one fluid inlet port intermediate said fluid outlet ports, a spool contained in said sleeve and is provided with two axially spaced apart lands for cooperating with said outlet ports, means to rotate said spool in said sleeve, and means for converting the rotary motion of said spool into the axial movement, thereof.

7. The control device according to claim 3 wherein said control circuit comprises a tape for storing informations regarding the speed and quantity of said displacement of said axis, a tape reader to read out said informations, a pulse oscillator, means responsive to said speed information for presetting the frequency of the pulse generated by said pulse generator and means responsive to said quantity information for presetting the number of pulses supplied to said pulse motor from said pulse oscillator.

8. The control device according to claim 7 wherein said control circuit further includes means operated when said pulse motor is in its normal position that is when the axis of said shaft is maintained in the normal position for stopping the supply of said pulse to said pulse motor from said pulse oscillator.

* * * * *